United States Patent
Mizushima

(10) Patent No.: US 7,469,837 B2
(45) Date of Patent: Dec. 30, 2008

(54) STORAGE DEVICE

(75) Inventor: Nagamasa Mizushima, Fujisawa (JP)

(73) Assignee: Renesas Technology Corp., Toyko (JP)

( * ) Notice: Subject to any disclaimer, the term of this patent is extended or adjusted under 35 U.S.C. 154(b) by 25 days.

(21) Appl. No.: 11/443,244

(22) Filed: May 31, 2006

(65) Prior Publication Data

US 2006/0289659 A1    Dec. 28, 2006

(30) Foreign Application Priority Data

Jun. 24, 2005    (JP)    ............................ 2005-184501

(51) Int. Cl.
*G06K 19/05* (2006.01)
(52) U.S. Cl. ...................................... 235/492; 235/451
(58) Field of Classification Search ................. 235/492, 235/441, 451; 711/103, 163, 106, 152, 172
See application file for complete search history.

(56) References Cited

U.S. PATENT DOCUMENTS

| | | | | | |
|---|---|---|---|---|---|
| 5,923,884 | A | * | 7/1999 | Peyret et al. | ................. 717/167 |
| 6,003,113 | A | * | 12/1999 | Hoshino | ..................... 711/106 |
| 7,281,101 | B2 | * | 10/2007 | Mizushima et al. | .......... 711/163 |
| 2004/0162932 | A1 | | 8/2004 | Mizushima et al. | |
| 2004/0249993 | A1 | * | 12/2004 | Hori et al. | ...................... 710/20 |

FOREIGN PATENT DOCUMENTS

JP    2004-295160    10/2004

* cited by examiner

*Primary Examiner*—Daniel St.Cyr
(74) *Attorney, Agent, or Firm*—Antonelli, Terry, Stout & Kraus, LLP.

(57) ABSTRACT

In a memory card including an IC card chip which can store and execute an application program, a flash memory chip which can store confidential data relating to the application program, and a controller chip which is connected to the chips, the IC card chip performs verification of a host apparatus, and the controller chip permits transmission of the confidential data between the flash memory chip and the host apparatus when the host apparatus is authenticated through the verification.

10 Claims, 8 Drawing Sheets

STORAGE DEVICE

CROSS-REFERENCE TO RELATED APPLICATION

The present application claims priority from Japanese application serial No. 2005-184501 filed on Jun. 24, 2005, the content of which is hereby incorporated by reference into this application.

BACKGROUNDS OF THE INVENTION

The present invention relates to a storage device provided with a security function, a host apparatus to which the storage device can be inserted, and a host apparatus including the storage device, and in particular to a technique effectively applied to a memory card having a flash memory chip, a controller chip, and an IC card chip, or the like.

For example, U.S. Patent Application Publication 2004/0162932 (corresponding to Japanese Patent Laid-open Publication No. 2004-295160) as a conventional technique examined by the present inventors describes a memory card where divided memory areas are allocated to respective application programs (Applets) on an IC card one by one and one applet can read and write, without being violated by another applet, confidential data in an area allocated to itself if need arises.

SUMMARY OF THE INVENTION

In the above-described conventional technique such as described in U.S. Patent Application Publication 2004/0162932, when a large volume of confidential data is read and outputted to an external host apparatus authenticated by an applet in an IC card from a memory area allocated to the applet or when a large volume of confidential data inputted from the host apparatus is written in the memory area, processing efficiency is considerably poor. That is, since an access request message from an applet in the IC card to a memory controller is required in order to perform reading/writing from/to the memory area, each time when the confidential data in the memory area is outputted to an external host apparatus, the confidential data must be once delivered to an applet in the IC card.

Alternatively, each time when confidential data inputted from an external host apparatus is written in the memory area, the confidential data must be once delivered to the applet in the IC card. Since a data transmission rate at an interface of an IC card is ordinarily about several tens kilobits/second, which is very slow as compared with about several tens megabits/second of a data transmission rate at an interface of a memory chip, a time period for transmitting confidential data between the memory card and an authenticated host apparatus is much longer than a time period for transmitting ordinary data (which is not confidential) between the memory card and an ordinary host apparatus.

Therefore, an object of the present invention is to provide a storage device such as a memory card in which when an external host apparatus authenticated by an application in an IC card function module reads/writes confidential data in a memory area allocated to the application, the confidential data can be transmitted efficiently at high speed without passing through the application in the IC card function module.

The present invention is applied to a storage device, such as a memory card, which includes an interface for connecting to an external host apparatus, an IC card function module that can store an applet and can execute the applet, a non-volatile memory that can store confidential data related to the applet, and a memory controller that is connected to the interface, the IC card function module, and the non-volatile memory, and it has the following features.

For example, the memory controller responds to a first command received at the interface from the host apparatus to transfer a key from the IC card function module to a volatile storage circuit. The memory controller responds to a second command received at the interface from the host apparatus to encrypt or decrypt data transmitted between the non-volatile memory and the host apparatus in a cryptographic processing circuit using the key.

Further, the IC card function module performs verification of the host apparatus. The memory controller authorizes transmission of confidential data between the non-volatile memory and the host apparatus when the host apparatus is authenticated by the verification.

Alternatively, the non-volatile memory has an administration region where an application ID for identifying an applet and a key for encrypting transmission information between the IC card function module and the memory controller are stored in a corresponding manner.

Specifically, one portion of the memory area on the non-volatile memory is partitioned to a plurality of blocks, and ownership of a block is allocated to each applet in the IC card function module. The applet authenticates an external host apparatus which is allowed to read/write confidential data in a memory block allocated to itself, and the applet and the host apparatus share a key unknown to a third party. When being transmitted between the storage device and the host apparatus, the confidential data in the memory block is encrypted and signed using the key, so that information interception or falsification by the third party is prevented. The shared key is transmitted from the IC card function module to the memory controller according to a request from the applet, and the memory controller temporarily holds the shared key.

Thereafter, when the host apparatus requests the storage device to write confidential data to the memory block, the memory controller decrypts and verifies the confidential data inputted from the host apparatus using the shared key to writes the data in the memory block. Alternatively, when the host apparatus requests the storage device to read confidential data from the memory block, the memory controller reads, from the memory block, confidential data to be outputted to the host apparatus to sign and encrypt the data using the shared key.

According to the present invention, such an advantage can be obtained that, when the external host apparatus authenticated by an application in an IC card function module reads/writes data in a memory area allocated to the application, the data can be transmitted efficiently at high speed without passing through the application in the IC card function module.

DESCRIPTION OF THE PREFERRED EMBODIMENTS

Figure 1:
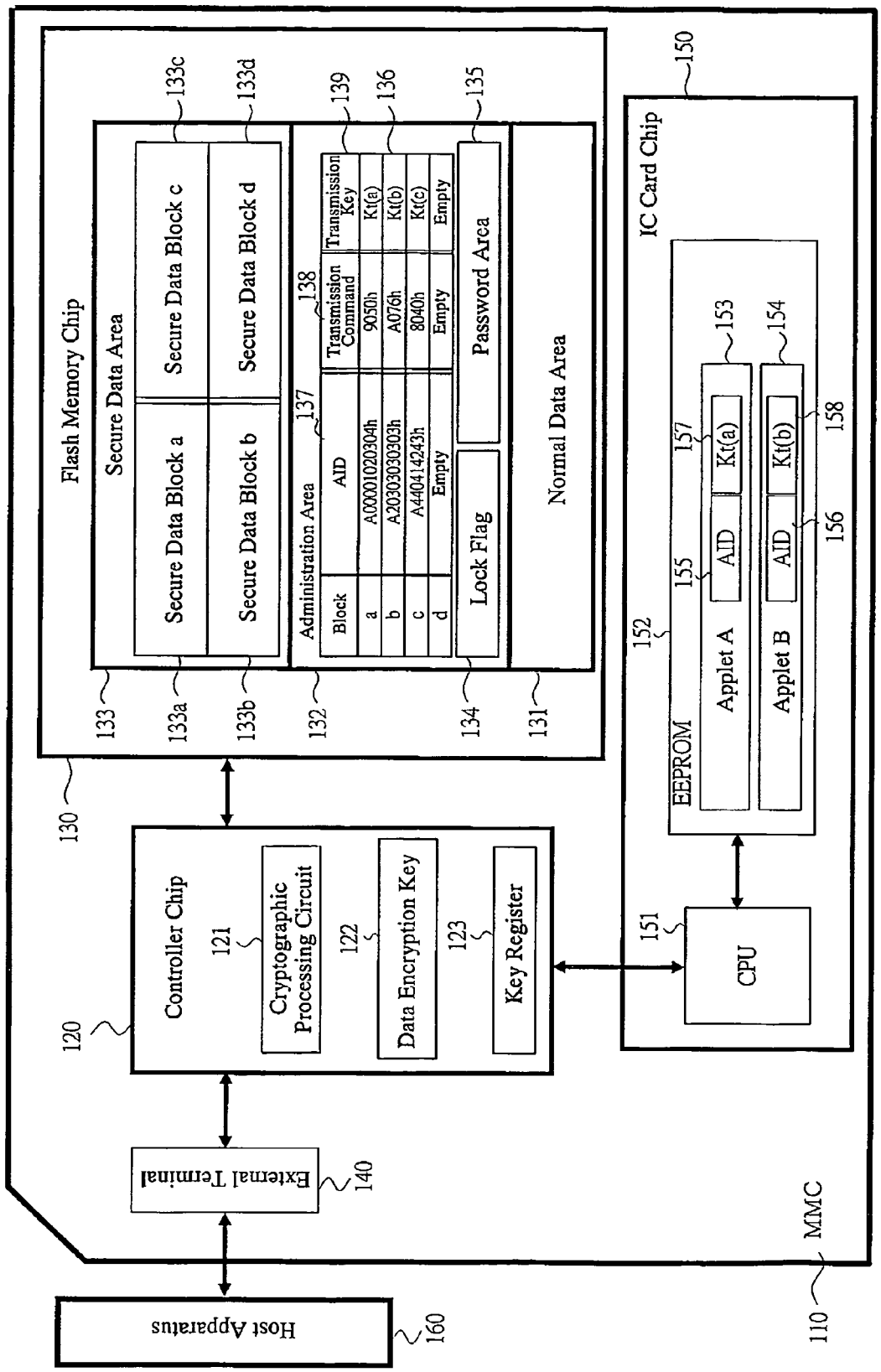
FIG. 1 is a diagram showing one example of an internal configuration of an MMC of an embodiment to which the present invention has been applied.

Embodiments of the present invention will be described below in detail with reference to the drawings. Note that the same members are denoted, through all the drawings for explaining the embodiments, by the same reference numerals in principle and repetitive explanations thereof will be omitted.

In the following explanation, the case where the present invention is applied to a memory card having a flash memory chip, a controller chip, and an IC card chip will be described as one example of a storage device including a security function. However, the present invention is not limited to the case.

Also, respective constituent elements which are features of the present invention have the following correspondence relationship in the embodiments described below. An IC card function module corresponds to an IC card chip, a non-volatile memory corresponds to a flash memory chip, a memory controller corresponds to a controller chip, and a cryptographic processing circuit and a volatile storage circuit correspond to a key register, respectively.

FIG. 1 is a diagram simply showing an internal configuration of a MultiMediaCard (which is a registered trademark of Infineon Technologies AG and is hereinafter abbreviated as "MMC") of an embodiment to which the present invention has been applied.

It is preferable that the MMC 110 conforms to a MultiMediaCard specification. The MMC 110 has a storage function which can read and write file data when a host apparatus 160 connected externally issues a memory card command conforming to a protocol specification of the MultiMediaCard and a security processing function that can perform a cryptographic operation required for confidential data protection, personal authentication, or the like.

The host apparatus 160 may be, for example, a portable, mobile, or cellular phone, a personal digital assistance (PDA), a personal computer, a music reproducing (and recording) device, a camera, a video camera, an automated teller machine, a kiosk terminal, a payment terminal, or the like.

The MMC 110 has an MMC external terminal 140, a controller chip 120, a flash memory chip 130, and an IC card chip 150.

The flash memory chip 130 is a memory chip with a large capacity (for example, 128 megabytes) having a non-volatile semiconductor memory as a recording medium, and it can read and write data according to a flash memory command. The MMC external terminal 140 is constituted of a plurality of terminals, and the terminals include a power supplying terminal, a clock input terminal, a command input/output terminal, a data input/output terminal, and a ground terminal for information or data exchange with the external host apparatus 160.

The controller chip 120 is connected to other constituent elements in the MMC 110 (the MMC external terminal 140, the flash memory chip 130, and the IC card chip 150), and it is a microcomputer chip for controlling these constituent elements.

The IC card chip 150 is a microcomputer chip for embedding an IC card in a plastic board, and its external terminal and electric signal protocol and command conform to ISO/IEC 7816 standard. The external terminals of the IC card chip 150 include a power supplying terminal, a clock input terminal, a reset input terminal, an I/O (input/output) terminal, and a ground terminal. The external terminals of the IC card chip 150 is such that the power supplying terminal, the clock input terminal, the reset input terminal, and the I/O terminal are connected to the controller chip 120 except for the ground terminal.

The controller chip 120 performs an operation required for a security processing demanded from the external host apparatus 160 when an IC card command is issued from the external terminal of the IC card chip 150 to the IC card chip 150. The IC card chip 150 includes a CPU 151 for performing an operation processing, and an EEPROM (Electrically Erasable Programmable Read Only Memory) 152. On the other hand, the flash memory chip 130 includes a storage element, but it includes no microcomputer.

The security processing is performed by the CPU 151, for example, when data is written in the EEPROM 152 in the IC card chip 150 or when data is read from the EEPROM 152. Detail contents of the security processing are described by a program code stored in the EEPROM 152. The program code is configured as a plurality of modules different in function so that it can be applied to various security processings. The CPU 151 can perform switching between modules to be used for a security processing according to needs. The module unit is called "applet".

For example, the EEPROM 152 stores an applet A 153 and an applet B 154. The respective applets in the IC card have their own application identifiers (hereinafter, called "AID (Application Identifier)"). In FIG. 1, an AID of the applet A 153 is denoted as 155, while an AID of the applet B 154 is denoted as 156. It is preferable that the AIDs are values allocated uniquely internationally in order to identify an application program in the IC card. A number-allocating method for AID distributed internationally is defined in ISO/IEC7816-5 as International Standard. A storage capacity of the EEPROM 152 is, for example, 64 kilobytes, and it is smaller than the storage capacity of the flash memory chip 130. However, the storage capacity of the EEPROM 152 may be equal to or larger than that of the flash memory chip 130 for implementation of the present invention.

As the IC card chip 150, a product authenticated by an evaluation and authentication organization of ISO/IEC 15408 which is International Standard for security evaluation reference is utilized. In general, when an IC card having a function for performing a security processing is utilized for an actual electronic payment service or the like, the IC card must be subjected to evaluation and approval from an evaluation and authentication organization of ISO/IEC 15408. When an MMC 110 realized by adding a function for performing a security processing to an MMC is utilized for an actual electronic payment service or the like, the MMC 110 must be subjected to evaluation and approval from the evaluation and authentication organization of ISO/IEC 15408 like the above. When the MMC 110 is structured to incorporate the IC card chip 150 authenticated by the evaluation and authentication organization therein and utilize the IC card chip 150 to perform the security processing, a security processing function can be obtained. Accordingly, the MMC 110 can satisfy security evaluation criteria based upon ISO/IEC 15408 easily, and it can shorten a development period for adding the security processing function to the MMC.

It is preferable that the MMC 110 has an external interface conforming to a MultiMediaCard specification. The MMC 110 receives not only a standard memory card command conforming to the MultiMediaCard specification but also a command for performing a security processing (hereinafter, called "secure write command") through one kind of external interface. The secure write command includes input data following the same. The controller chip 120 has a function for selecting a chip to be accessed to distribute a command processing according to whether a command received by the MMC 110 is the standard memory card command or the secure write command. If the MMC 110 receives the standard memory card command, it can select the flash memory chip 130 to issue a flash memory command to the flash memory chip 130, thereby performing reading/writing of host data. In addition, if the MMC 110 receives the secure write command, it can select the IC card chip 150 to issue an IC card command to the same, thereby performing a security processing.

The IC card command issued here is embedded in data inputted by a secure write command (hereinafter, called "secure write data"). The IC card chip 150 returns an IC card response back according to the command, but the controller chip 120 caches it. Further, the MMC 110 also receives a command for reading the result of the security processing (hereinafter, called "secure read command") through one kind of external interface. The secure write command includes output data following the same. If the MMC 110 receives the secure read command, it outputs data including the cached IC card response (hereinafter, called "secure read data").

FIGS. 6A and 6B show one example of a format of the secure write data and the secure read data. It is preferable that the format is applied to the case where a content of a security processing to be performed can be represented as one IC card command and a result of the security processing can be represented as one IC card response.

As described above, both an IC card command transmitted to the IC card chip 150 and an IC card response received from the IC card chip 150 conform to ISO/IEC 7816-4 Standard. According to this Standard, a header of four bytes (class byte CLA, instruction byte INS, parameter bytes P1 and P2) is essential for a constitution of an IC card command, and an input data length indicating byte Lc, an input data field DataIn, and an output data length indicating byte Le follow thereafter if necessary. Statuses SW1 and SW2 of two bytes are essential for a constitution of the IC card response, and an output data field DataOut 613 is put before them if necessary.

A secure write data 601 in the format is configured by attaching IC card command length Lca 604 before the IC card command 602 and further patting dummy data 605 behind the IC card command 602. A value of the Lca 604 is a value obtained by summing of lengths of respective constituent elements (CLA, INS, P1, P2, Lc, DataIn 606, and Le) of the IC card command 602. On the other hand, the secure read data 611 is configured by attaching IC card response length Lra 614 before the IC card response 612 and further patting dummy data 615 behind the IC card response 612. A value of the Lra 614 is a value obtained by summing lengths of respective constituent elements (DataOut 613, SW1 (616), and SW2 (617)) of the IC card response 612.

Figure 6:
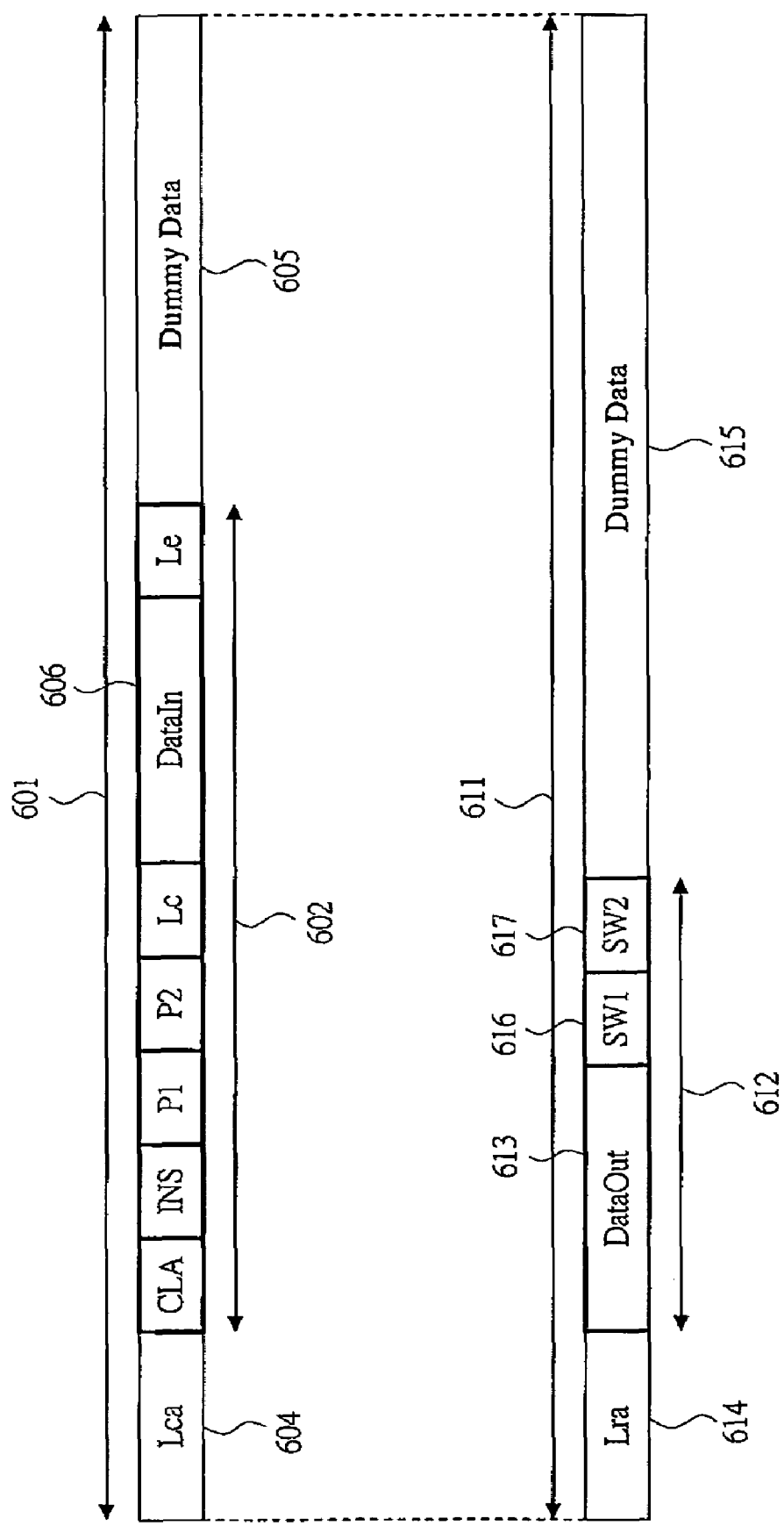
FIG. 6 is a diagram showing one example of a configuration of secure write data and secure read data in the embodiment to which the present invention has been applied.

Note that FIG. 6 shows one format example corresponding to the case where Lc, DataIn, and Le are included in the IC card command while DataOut is included in the IC card response. In a specification of a data read/write command included in a standard memory card command to the MMC 110, data to be read/write-accessed is fundamentally processed based on a block unit of a fixed length. Accordingly, it is preferable that the size of the secure write data 601 or the secure read data 611 is caused to coincide with a block size conforming to a specification for a standard memory card command of the MMC 110.

The dummy data 605 or 615 is applied to cause the size of the secure write data 601 or the secure read data 611 to coincide with the block size. It is preferable that a value adopted as the block size is a sector size (512 bytes) in an FAT system adopted in a logical file system by an ordinary small-sized memory card. The dummy data 605 and 615 to be padded may be all zero or random, or may be the checksum utilized for detecting a data error or correcting the same by the controller chip 120 or the host apparatus 160. The value of the Lca 604 is used by the controller chip 120 to remove the dummy data 605 from the secure write data 601 to extract the IC card command 602, while the value of the Lra 614 is used by the host apparatus 160 to remove the dummy data 615 from the secure read data 611 to extract the IC card response 612.

In FIG. 1, the controller chip 120 controls power supplying and clock supplying to the IC card chip 150 through the power supply terminal and the clock input terminal. When the security processing is not required from the host apparatus 160, power supplying and clock supplying to the IC card chip 150 can be stopped, so that power consumption in the MMC 110 can be reduced. In order to switch the IC card chip 150 put in no power supplying state to a state of being able to receive an IC card command, it is necessary to start power supplying to the IC card chip 150 to perform a resetting processing. When the MMC 110 receives a secure write command from the host apparatus 160, the controller chip 120 has a function to start power supplying to the IC card chip 150 via the power supplying terminal.

In addition, when the MMC 110 receives a secure write command from the host apparatus 160, the controller chip 120 has a function to perform a resetting processing of the IC card chip 150 through the reset input terminal. The controller chip 120 can stop power supplying to the IC card chip 150 until it receives a secure write command. Accordingly, power consumption in the MMC 110 can be reduced. The controller chip 120 has a function to generate a clock signal to be supplied to the IC card chip 150 through the clock input terminal of the IC card chip 150 within the MMC 110 and to control frequency, supply start timing, and supply stop timing thereof. Since setting can be performed independently of a clock signal at the clock input terminal in the MMC external terminal 140, security to an attacking method called "timing analysis, power difference analysis, or fault utilization analysis" performed by the host apparatus 160 is improved.

In FIG. 1, the flash memory chip 130 includes a normal data area 131, an administration area 132, and a secure data area 133. The normal data area 131 is a region where a logical address is mapped in a sector unit, and is a region where the host apparatus 160 can read and write data from and in a logical address designated by using the standard memory card command. The secure data area 133 is a region storing therein data to be handled when the CPU 151 carries out an applet (for example, 153 or 154) stored in the EEPROM 152 within the IC card chip 150 (namely, when the security processing is performed).

The controller chip 120 has a data encryption key Kd 122. The controller chip 120 encrypts data stored in the secure data area 133 using the data encryption key Kd 122 to protect the data from information interception performed by a third party. Even if the MMC 110 is disassembled unduly and the flash memory chip 130 is extracted therefrom and data is read from the flash memory chip 130, contents of the data can not be decrypted, so that security can be improved. It is preferable that the data encryption key Kd 122 is managed by a manufacturer of the MMC 110.

The secure data area 133 is partitioned to a plurality of blocks. This is called a "secure data block". For example, the secure data area 133 is constituted of four secure data blocks 133a, 133b, 133c, and 133d. The secure data block is such a unit that the controller chip 120 can allocate an ownership of the secure data block to each applet. For example, the applet A 153 has an ownership of the secure data block c 133c, while the applet B 154 has an ownership of the secure data block a 133a. Further, each secure data block is divided to a plurality of fixed length data records. For example, the size of one record is 128 bytes, and one secure data block is constituted of 8192 records. At this time, the size of one secure data block becomes one megabyte, and the capacity of the secure data area 133 becomes 4 megabytes. Accordingly, an applet stored in the EEPROM 152 can utilize non-volatile data more in capacity than the EEPROM 152 by accessing data stored in the secure data area 133.

For example, when the applet A 153 in the IC card chip 150 is a program for performing a security processing regarding electronic payment, by storing payment logs (payment amount, date, and the like) in the secure data area 133, payment logs more than those obtained by utilizing only the EEPROM 152 can be reserved, which results in improvement in convenience for a user. Considering the diversity of information administration in an electric payment system, it is supposed that the payment log is not only administrated internally by the applet A 153 but also it is read to the external host apparatus 160 or is updated by the host apparatus 160. In order to realize such a mechanism, a payment log should be encrypted and signed using any key when transmitted between the MMC 110 and the host apparatus 160 so that information interception or falsification by the third partly is prevented. Therefore, it is necessary to share a key which is unknown by the third party between the applet A 153 and the host apparatus 160 in advance. Persons or parties sharing the key must have trust in each other. That is, the applet A 153 should authenticate the external host apparatus 160 that is allowed to read and write data within the secure data block c 133c allocated to the applet A 153 itself.

According to the present invention, the key shared by the authenticated host apparatus 160 is transmitted from the IC card chip 150 to the controller chip 120 according to a request from the applet A 153, and the controller chip 120 temporarily holds the key in the key register 123. Thereafter, when the host apparatus 160 requests the MMC 110 to perform data-writing in the secure data block 133c, the controller chip 120 decrypts and verifies the data inputted from the host apparatus 160 using a shared key Ks within the key register 123 and encrypts the data using the data encryption key Kd 122 and then it writes the data in the secure data block 133c. Alternatively, when the host apparatus 160 requests the MMC 110 to perform data-reading from the secure data block 133c, the controller chip 120 reads data to be outputted to the host apparatus 160 from the secure data block 133c and decrypts the data using the data encryption key Kd 122 and then it signs and encrypts the data using the shared key Ks within the key register 123. Accordingly, such a processing that the applet A 153 reads a payment log to an external host apparatus 160 authenticated or the host apparatus 160 updates the payment log can be realized efficiently by the present invention.

The controller chip 120 has a cryptographic processing circuit 121 for performing the above-described encryption, decryption, sign, and verification. It is preferable that the cryptographic processing circuit 121 is configured of logical circuits exclusive for cryptographic processing in order to improve transmission performance of data. It is also preferable that the above-described key register 123 is constituted of a volatile RAM (Random Access Memory) in order to improve safety to loss or theft.

On the other hand, the administration area 132 is a region where information utilized by the controller chip 120 for administrating the secure data area 133 is stored. When the MMC 110 receives a secure write command from the host apparatus 160, the controller chip 120 stores information in the administration area 132 or deletes information from the administration area 132. The command will be described later. The administration area 132 includes a lock flag 134, a password area 135, and an administration table 136.

The administration table 136 is a region to which an applet having an ownership of each secure data block constituting the secure data area 133 is registered. It is preferable that an applet is registered by storing AID in the region in order to identify the applet. By utilizing the AID, the applet using the secure data area 133 can be securely identified. The controller chip 120 prohibits storing of a plurality of equal AIDs in the AID 137. A leading address value of a block serving as a block identifier for identifying a secure data block is registered in a block column in the administration table 136. Incidentally, a unique number within the MMC is registered as the block identifier instead of the leading address value. Note that the AID can be registered directly in each secure data block instead of the administration table 136.

Not only the AID 137 but also a transmission command 138 corresponding to each applet can be stored in the administration table 136. The transmission command 138 is registered when the controller chip 120 allocates an ownership of a secure data block for an applet. The transmission command is a value of 2 bytes set in CLA byte and INS byte of a command APDU (Application Protocol Data Unit) of "shared key transmission command". Here, the "shared key transmission command" is a command with an IC card command format issued to the IC card chip 150 by the controller chip 120 before an access from the host apparatus 160 reaches the secure data area 133 in order to transmit the shared key Ks used for an access between the controller chip 120 and the IC card chip 150. Details of this command will be described later.

A processing program for outputting the shared key Ks when the applet (153 or 154) receives the shared key transmission command is described in the applet (153 or 154) having an ownership of the secure data area 133. The transmission command 138 can be determined individually to each of applets. If the transmission command is a fixed value common to all applets, there is a possibility that conflict in coding will occur between an applet-specific command included in a secure write data from the host apparatus 160 and the shared key transmission command. According to the present invention, such coding conflict can be prevented. Incidentally, the INS code in the transmission command 138 must conform to ISO/IEC 7816-3 in view of the transmission protocol.

A transmission key 139 can be further stored in the administration table 136 for each applet. The transmission key 139 is a key for protecting the shared key Ks transmitted between the controller chip 120 and the IC card chip 150 by encryption and sign from information interception or falsification performed by the third party. The respective applets in the IC card own respective transmission keys Kt. In FIG. 1, a transmission key Kt(a) of the applet A 153 is indicated as 157, while a transmission key Kt(b) of the applet B 154 is indicated as 158. The applet signs and encrypts the shared key Ks using its own transmission key Kt to transmit the shared key Ks to the controller chip 120. The controller chip 120 can decrypt and verify the shared key Ks using the same transmission key Kt obtained from the administration table 136 to acquire the shared key Ks reliably.

A lock flag 134 is a region where data of one byte for indicating whether or not registered information stored in the administration table 136 can be changed is stored. Setting FFh in this region indicates that a change of information in the administration table 136 is in a prohibited state (lock state). Setting 00h in the region indicates that a change of information in the administration table 136 is in a permitted state (unlock state).

The password area 135 is a region where a reference value of a password of 255 bytes for putting information in the administration table 136 in the unlock state is stored. When the information in the administration table 136 is locked, the password reference of 255 bytes must be set in the region according to a secure write command from the host apparatus 160. When the information in the administration table 136 is unlocked, it is necessary to input the same password as the password reference set at the locking time according to a secure write command from the host apparatus 160. Change of the information in the administration table 136 can be unlocked according to correspondence between the inputted password and the password reference.

An access to the administration area 132 is restricted physically by the controller chip 120 so that the host apparatus 160 cannot make an unauthorized assess for analyzing a security processing. That is, since a logical address is not allocated to the administration area 132 by the controller chip 120, the host apparatus 160 can not read/write data directly. Accordingly, reliability and safety of the security processing performed by the MMC 110 are improved.

Figure 2:
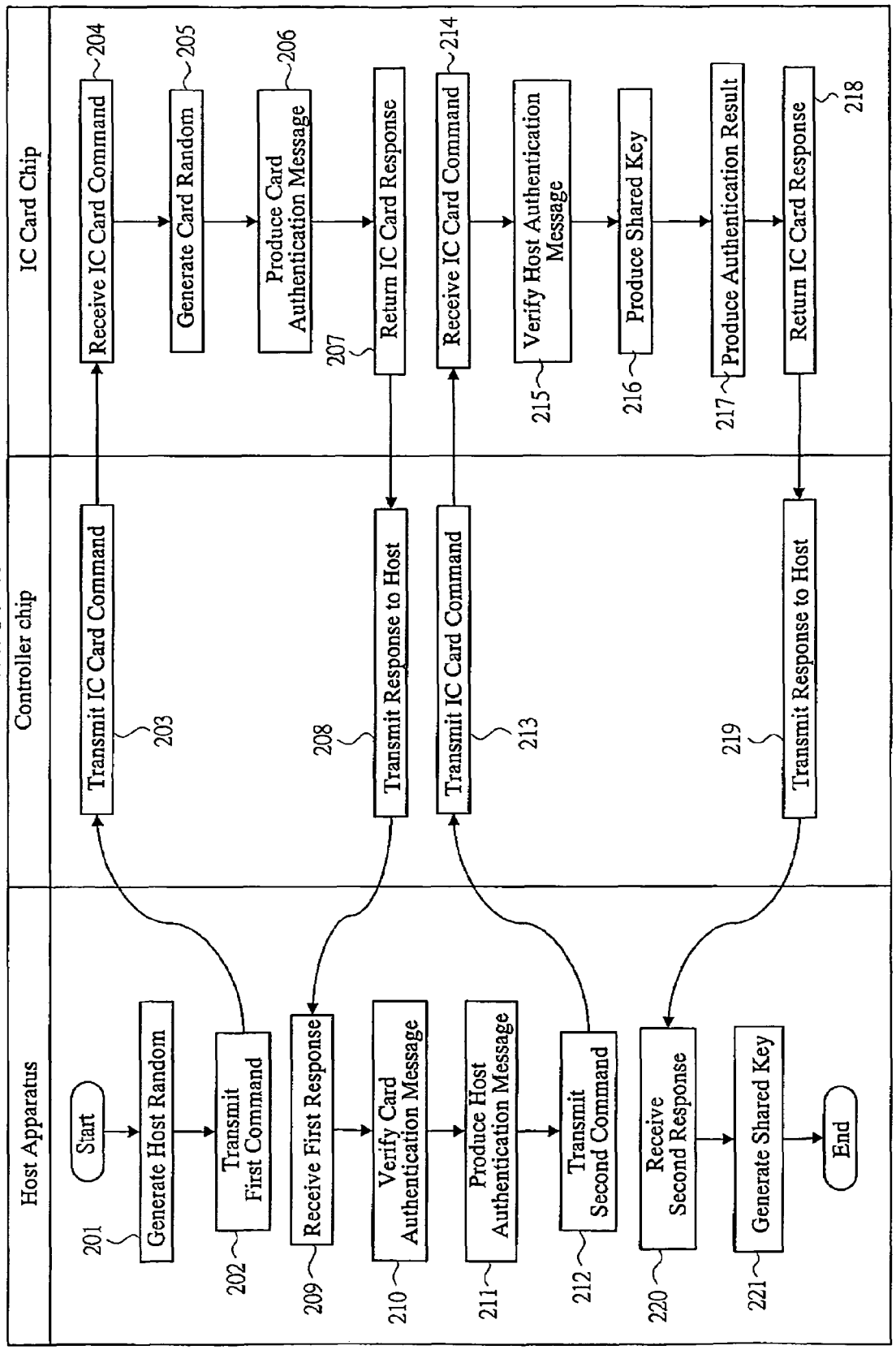
FIG. 2 is a flowchart showing one example of a processing for sharing the same key during mutual authentication between a host apparatus and an applet of an IC card chip in the embodiment to which the present invention has been applied.

It is preferable in implementation of the present invention that an applet in the IC card authenticates an external host apparatus 160, which is authorized to read and write data in the secure data block allocated to the applet itself, and dynamically generates a key to be shared between the applet and the external host apparatus 160 through the authentication. FIG. 2 shows one example of a processing flow thereof. As a prerequisite for this processing, it is assumed that the host apparatus 160 and the applet in the IC card know the same authentication key Ka mutually. A flow of the processing will be described below.

The host apparatus 160 produces a host random (step 201). The first command is an IC card command for transmitting the host random to an applet, and the host apparatus 160 transmits the first command to the MMC 110 by a write secure command (step 202). The controller chip 120 in the MMC 110 extracts a command APDU of the first command to transmit the same to the IC card chip 150 as an IC card command (step 203). The IC card chip 150 receives the command APDU (step 204). The IC card chip 150 generates a card random (step 205).

Next, the IC card chip 150 prepares a card authentication message obtained by encrypting the acquired host random using the authentication key Ka (step 206) and returns, to the controller chip 120, an IC card response including the card authentication message and the card random (step 207). The controller chip 120 receives the IC card response to transmit the same to the host apparatus 160 through a secure read command as a first response (step 208). The host apparatus 160 receives the first response (step 209) to decrypt the card authentication message contained in the first response using the authentication key Ka, and verifies whether or not the host random is restored (step 210). The host apparatus 160 confirms restoration of the host random to authenticate that the card is right.

Then, the host apparatus 160 prepares a host authentication message by encrypting the acquired card random using the authentication key Ka (step 211). The second command is an IC card command for transmitting the host authentication message, and the host apparatus 160 transmits the second command to the MMC 110 through the write secure command (step 212). The controller chip 120 in the MMC 110 extracts a command APDU in the second command to transmit the same to the IC card chip 150 as an IC card command (step 213). The IC card chip 150 receives the command APDU (step 214). Then, the IC card chip 150 decrypts the host authentication message in the command APDU using the authentication key Ka to verify whether the card random is restored (step 215). The IC card applet confirms restoration of the card random to authenticate that the host apparatus 160 is right. Next, the IC card chip 150 generates a shared key Ks by taking an exclusive OR of the card random and the host random to encrypt the same using the authentication key Ka (step 216).

Then, the IC card chip 150 prepares a message for transmitting the authentication result to the host apparatus 160 (step 217), and returns the message back to the controller chip 120 as an IC card response (step 218). The controller chip 120 receives the IC card response to transmit the same to the host apparatus 160 through a secure read command as a second response (step 219). The host apparatus 160 receives the second response (step 220). The host apparatus 160 confirms that the authentication result is successful, and it generates a shared key Ks by taking an exclusive OR of the card random and the host random to encrypt the same using the authentication key Ka (step 221). As described above, the same key generated dynamically while the host apparatus 160 and the IC card chip 150 are authenticated mutually is shared by the host apparatus 160 and the IC card chip 150.

Incidentally, it is not essential to perform the authentication processing such as described above for implementation of the present invention. It is necessary to only share at least any key between an applet in the IC card and an external host apparatus 160. Therefore, such a constitution may be adopted that both the applet in the IC card and the external host apparatus 160 fixedly have the same key in advance and the key is always used for encryption or signature when data in the secure data block is transmitted between the host apparatus 160 and the MMC 110. In this constitution, however, since encryption analysis performed by a third party becomes easier than that in the above-described system (FIG. 2), safety is inferior.

The above-described shared key Ks is shared by both the host apparatus 160 and the IC card chip 150 through such a processing as shown in FIG. 2, and it is thereafter necessary to transmit the shared key Ks from the IC card chip 150 to the controller chip 120 in advance in preparation for arrival of a reading/writing access to the secure data area 133 from the host apparatus 160. Therefore, the controller chip 120 issues a "shared key transmission command" to the IC card chip 150. A command APDU and a response APDU in the shared key transmission command will be described below in detail with reference to FIGS. 3A to 3C.

Figure 3A:
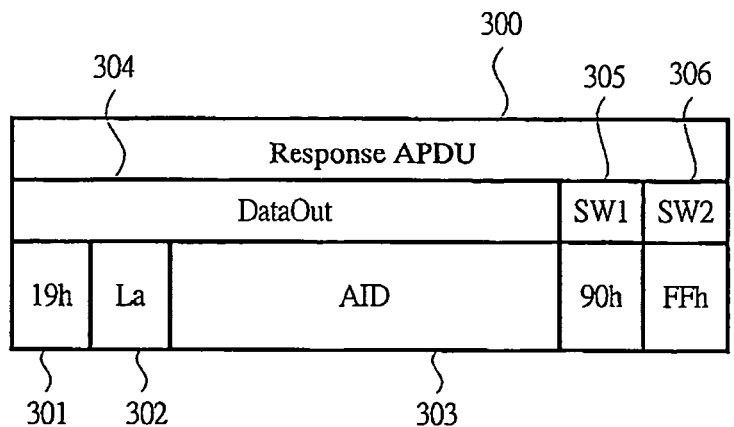
FIG. 3A is a diagram showing one example of a structure of an IC card command and an IC card response between a controller chip and the IC card chip in the embodiment to which the present invention has been applied.
Figure 3B:
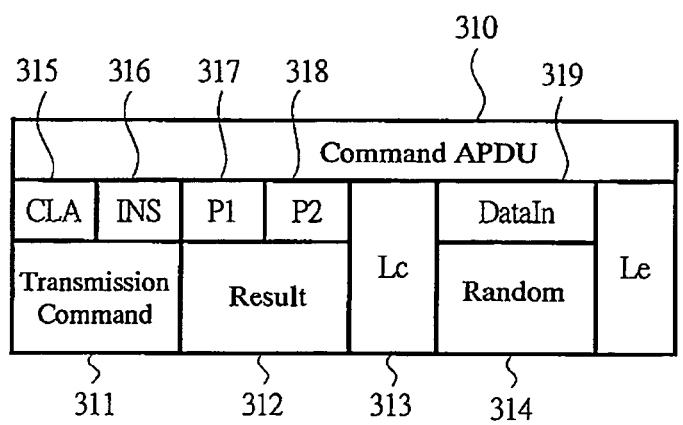
FIG. 3B is a diagram showing one example of a structure of an IC card command and an IC card response between a controller chip and the IC card chip in the embodiment to which the present invention has been applied.
Figure 3C:
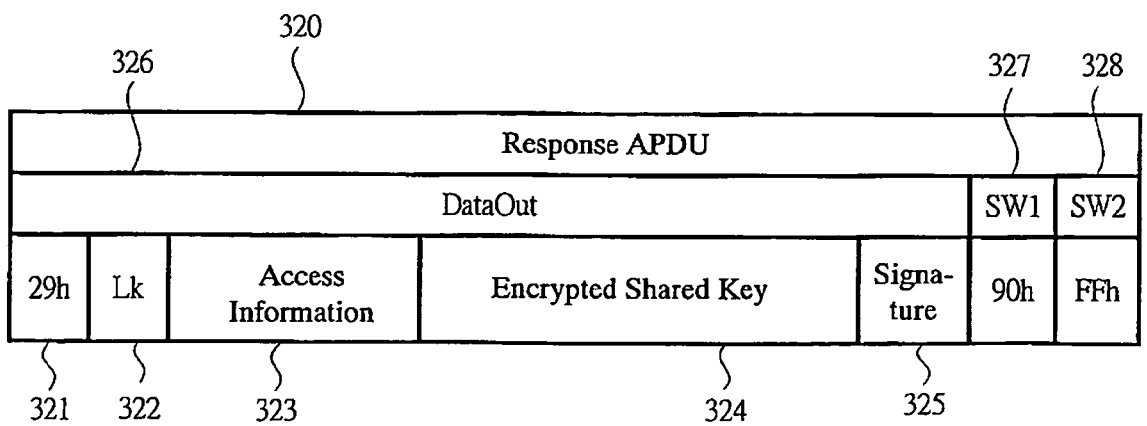
FIG. 3C is a diagram showing one example of a structure of an IC card command and an IC card response between a controller chip and the IC card chip in the embodiment to which the present invention has been applied.

FIGS. 3A and 3C show responses APDU outputted from the IC card chip 150. The IC card chip 150 notifies a shared key setting request to the controller chip 120 by setting special values in leading bytes (301, 321) of the DataOut 304, 326 included in these responses APDU 300, 320 and SW1 bytes 305, 327, and SW2 bytes 306, 328, respectively. Incidentally, second bytes (302, 322) from the leading bytes in DataOut 304 and 326 indicate the length of data subsequent thereto, and third bytes from the leading bytes and bytes subsequent thereto are used to transmit information required for the shared key setting request.

The IC card chip 150 must set an exclusive status value as 90FFh in the SW1 bytes 305, 327 and the SW2 bytes 306, 328 in order to request the controller chip 120 to set the shared key Ks. The controller chip 120 always monitors the response APDU outputted by the IC card chip 150, and when detecting that the values in the SW1 bytes 305, 327, and the SW2 bytes 306, 238 are 90FFh, the controller chip 120 examines the leading bytes 301, 321 in the DataOut 304, 326 positioned ahead thereof to confirm request content or the like. On the other hand, when these values are not 90FFh, the controller chip 120 outputs the secure read data including the response APDU to the host apparatus 160 as it is.

When the controller chip 120 starts shared key setting, it selects a secure data block (which the host apparatus 160 can access) to be made active from the secure data blocks 133a to 133d according to the kind of an applet selected on the IC card chip 150. Selection of accessible secure data block is performed just after a block selection request occurs from the IC card chip 150. FIG. 3A shows a message used therefor. A specification of data set in the DataOut 304 for the block selection request is shown below. 19h is set in a leading byte 301. An AID of an applet selected on the IC card chip 150 is set in the third byte from the leading byte and bytes subsequent thereto 303. For example, if the applet A 153 has been selected, AID 155 is set, while AID 156 is set if the applet B 154 has been selected. The length La of the AID is set in the second byte 302 from the leading byte.

When a leading byte of the response APDU is 19h, the controller chip 120 retrieves all the AIDs 137 within the administration table 136 using the AID 303 to determine a secure data block to be made active. When a corresponding AID can not be found, the controller chip 120 outputs secure read data including the response APDU to the host apparatus 160. After an AID is detected and a secure data block corresponding thereto is ascertained, the controller chip 120 recognizes that transmission of the shared key Ks starts. When the leading byte is one except for 19h, the controller chip 120 outputs the secure read data including the response APDU to the host apparatus 160.

After the controller chip 120 confirms the shared key transmission start, a value of the shared key Ks, an algorithm of the key, and a record number range which can be accessed by the authenticated host apparatus 160 can be transmitted from the IC card chip 150 to the controller chip 120 by issuing the shared key transmission command. FIG. 3B and FIG. 3C show a command APDU and a response APDU in the shared key transmission command, respectively. As described above, a value of a transmission command 311 registered for each applet in advance is set in a CLA byte 315 and an INS code 316 in the command APDU 310 in the shared key transmission command. Therefore, the transmission command 138 for the applet is read from the administration table 136.

In the command APDU 310 of the shared key transmission command, special values are set in a P1 byte 317 and a P2 byte 318 in order to notify the previous set result to the IC card chip 150. 0000h means that there is no error in the previous setting. 80XXh means that an error has occurred in the previous setting. Incidentally, XX is a hexadecimal code indicating any error content. In case of error occurrence, an access to an active secure data block from the host apparatus 160 is not permitted. Further, the command APDU 310 includes a random 314 in the input data DataIn 319. The random is an initialization vector used to calculate signature added for preventing falsification by an applet in transmitting the shared key Ks. Incidentally, the length of the random 314 is set in a Lc byte 313.

The IC card chip 150 returns a response APDU 320, whose leading byte 321 is 29h as shown in FIG. 3C, to the command APDU of the shared key transmission command. The applet in the IC card transmits the value of the shared key Ks, an algorithm of the key, and a record number range in which an authenticated host apparatus 160 can access, to the controller chip 120 using the third byte from the leading byte in the response APDU 320 and the bytes subsequent thereto. The value of the shared key Ks and the algorithm of the key are encrypted together using the transmission key Kt in order to avoid the risk that they are intercepted by the third party. An encrypted shared key 324 in FIG. 3C indicates the encryption. The record number range which the authenticated host apparatus 160 can access is indicated by access information 323. The information remains as plain sentences since it should not be made secrete.

Since the access information 323 and the encrypted shared key 324 must not be falsified by the third party, a signature 325 calculated using the transmission key Kt is added to an end thereof. A total length Lk of the access information 323, the encrypted shared key 324, and the signature 325 is set in the second byte 322 from the leading byte. Incidentally, the transmission key Kt used for the above encryption and signing is administrated for each applet, and the same key is also registered in the transmission key 139 in the administration table 136 in FIG. 1. The controller chip 120 acquires the transmission key Kt from the transmission key 139 to decrypt and verify the shared key Ks.

In a command APDU in a shared key transmission command just before the first transmission of the shared key (namely, first issued), 000h is set in the P1 byte 317 and the P2 byte 318 in FIG. 3B.

In 80XXh set in the access result 312 at an access error time, an example of a code XX indicating an error content is shown below.

XX=01 means an error indicating that a record number designated by the access information 323 is out of an accessible range.

XX=02 means an error indicating that the flash memory chip 130 cannot be utilized due to its failure or the like.

XX=03 means an error indicating that the value of a leading byte 321 is not 29h.

XX=04 means an error indicating that the value of the second byte 322 from the leading byte is wrong.

XX=05 means an error indicating failure in verification of the signature 325.

Figure 4:
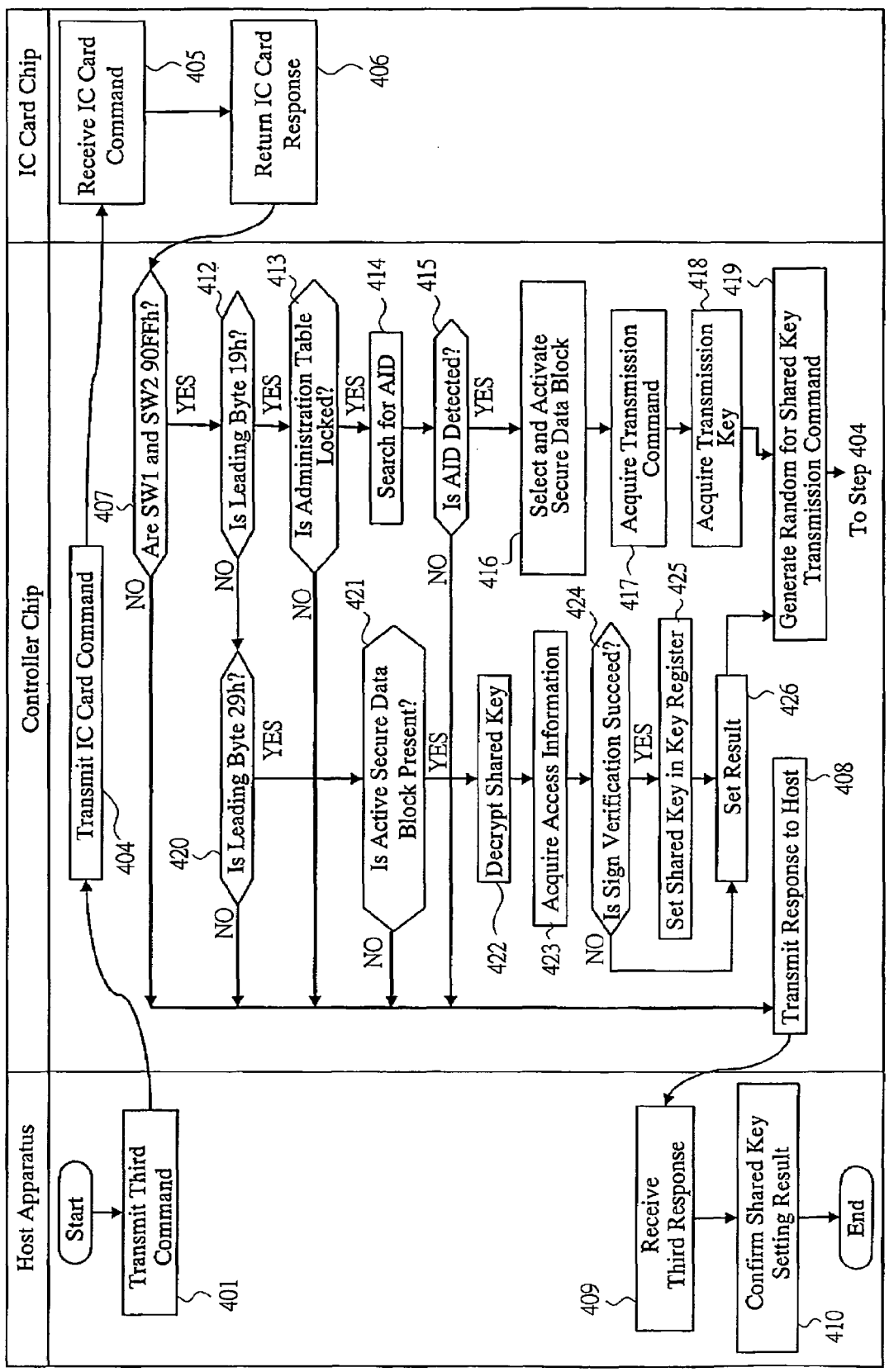
FIG. 4 is a flowchart showing one example of a processing for performing setting of a shared key according to a request from the IC card chip in the embodiment to which the present invention has been applied.

A flow of the processing performed when an applet in the IC card chip 150 starts shared key setting to the controller chip 120 and a flow of the processing performed when a key is transmitted by a shared key transmission command will be explained below with reference to FIG. 4.

A third command is an IC card command serving as a trigger for the shared key setting performed by the IC card applet, and the host apparatus 160 transmits the third command to the MMC 110 through the secure write command (step 401). The controller chip 120 extracts a command APDU in the third command to transmit the same to the IC card chip 150 as an IC card command (step 404).

The IC card chip 150 receives the IC card command (step 405), prepares an IC card response 300 requesting selection of a secure data block which can be accessed, and returns the same (step 406). The controller chip 120 receives the response to examine whether or not an SW1 byte 305 and an SW2 byte 306 in the response are 90FFh (step 407). When the SW1 byte 305 and the SW2 byte 306 are not 90FFh, the controller chip 120 proceeds to step 408. When the SW1 byte 305 and the SW2 byte 306 are 90FFh, the controller chip 120 examines whether or not the leading byte 301 is 19h (step 412). When the leading byte 301 is not 19h, the controller chip 120 proceeds to step 420. When the leading byte 301 is 19h, the controller chip 120 examines whether or not the administration table 136 is in a locked state (step 413). When the administration table 136 is unlocked, the controller chip 120 proceeds to step 408. When the administration table 136 is put in a locked state, the AID 137 on the administration table 136 is retrieved by the AID 303 (step 414). When a corresponding AID has been found (step 415), the controller chip 120 accepts the block selection request and the controller chip 120 proceeds to step 416. When any corresponding AID has not been found, the block selection request is rejected and the controller chip 120 proceeds to step 408.

In step 416, the controller chip 120 selects a secure data block corresponding to the detected AID 137 to make the same active. Further, the controller chip 120 acquires a corresponding transmission command 138 (step 417). The controller chip 120 also acquires a corresponding transmission key 139 (step 418). The controller chip 120 then generates a random for a shared key transmission command shown in FIG. 3B (step 419). Thereafter, the processing returns back to step 404, and the controller chip 120 issues an IC card command to the IC card chip 150. The IC card chip 150 receives the IC card command (step 405), prepares an IC card response 320 for transmitting the shared key Ks, and returns the same back (step 406).

In step 420, the controller chip 120 examines whether or not the leading byte 321 in the IC card response 320 is 29h. When the leading byte 321 is not 29h, the controller chip 120 proceeds to step 408. When the leading byte 321 is 29h, the controller chip 120 examines whether or not an active secure data block is present (step 421). When not present, the controller chip 120 proceeds to step 408. When present, the controller chip 120 decrypts the encrypted shared key 324 using the transmission key Kt acquired at step 418 and restores the value of the shared key Ks and the algorithm information thereof (step 422). Then, the controller chip 120 acquires access information 323 to reserve the same in a RAM within the controller chip 120 (step 423).

Next, the controller chip 120 verifies the signature 325 using the transmission key Kt acquired at step 418 (step 424). If succeeding the verification, the controller chip 120 sets up the cryptographic processing circuit 121 based upon the algorithm information, sets the shared key Ks in the key register 123 (step 425), and prepares for an access to the secure data block from the host apparatus 160. The controller chip 120 sets a result of "setting succession" for the shared key transmission command shown in FIG. 3B (step 426), and the controller chip 120 proceeds to step 419. On the other hand, when the verification at step 424 has been failed, the controller chip 120 sets a result of "setting failure" for the shared key transmission command (step 426), and the controller chip 120 proceeds to step 419.

Thereafter, the controller chip 120 returns back to step 404, and the controller chip 120 reissues the IC card command to the IC card chip 150. The IC card chip 150 receives the IC card command (step 405), prepares an IC card response for transmitting the result of the shared key setting to the host apparatus 160, and returns back the same (step 406). Incidentally, a value except for 90FFh is set in the SW1 and the SW2 in the response and the processing proceeds immediately to step 408 from step 407.

A third response is an IC card response last received from the IC card chip 150 at a time when the processing reaches step 408. The host apparatus 160 receives the third response from the secure read command (step 409). When the third response includes the result of the shared key setting, the host apparatus 160 sees the result to confirm whether or not the shared key Ks has been set (step 410).

Figure 7:
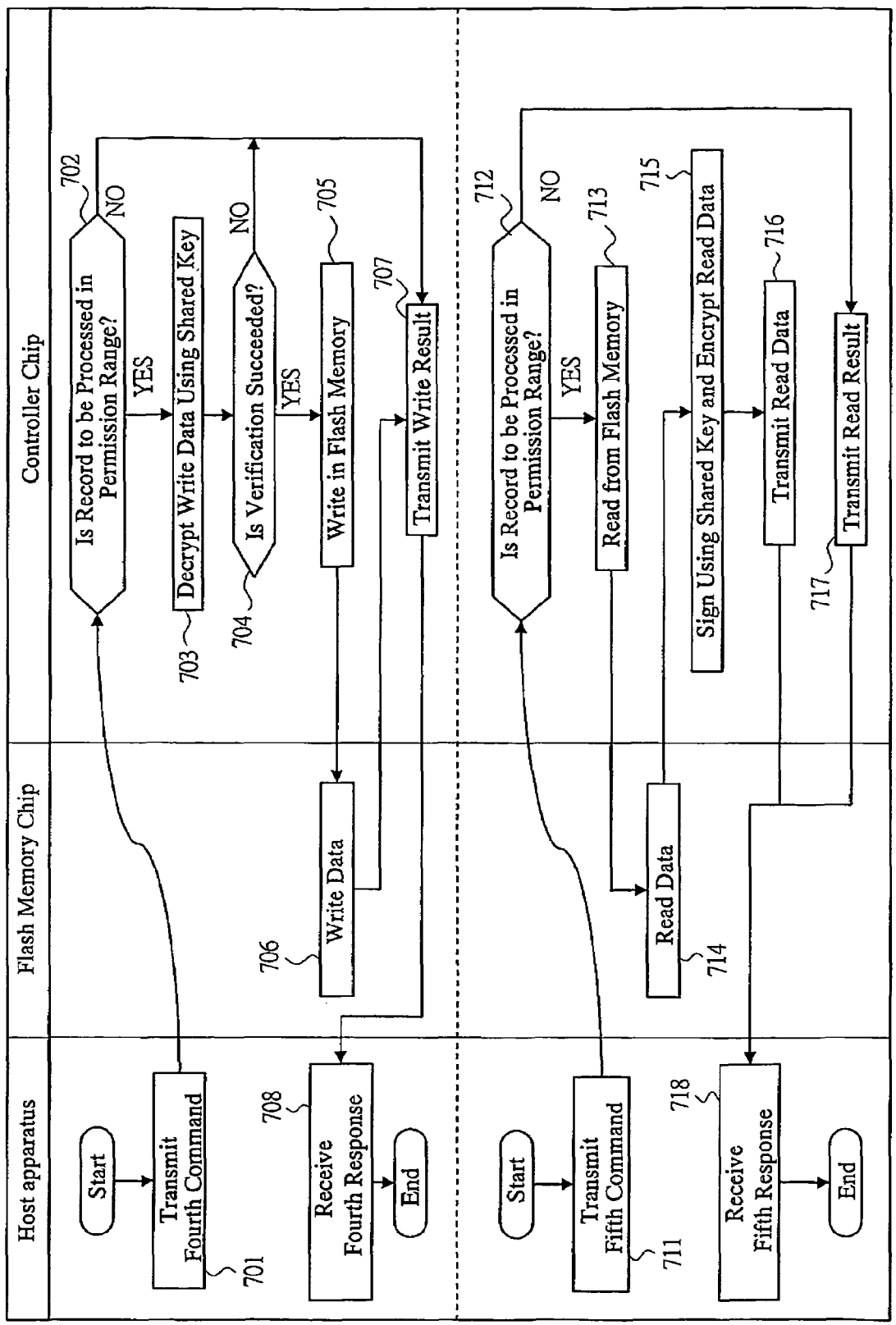
FIG. 7 is a flowchart showing one example of a processing in which an authenticated host apparatus performs a write/read-access to a secure data block administrated by an applet in the IC card chip in the embodiment to which the present invention has been applied.

After the host apparatus 160 confirms that the shared key Ks has been set inside the controller chip 120 as described above, it performs an access to the secure data block. A flow of a processing performed when the host apparatus 160 performs a write/read access to a secure data block will be described below with reference to FIGS. 7 and 8.

Figure 8A:
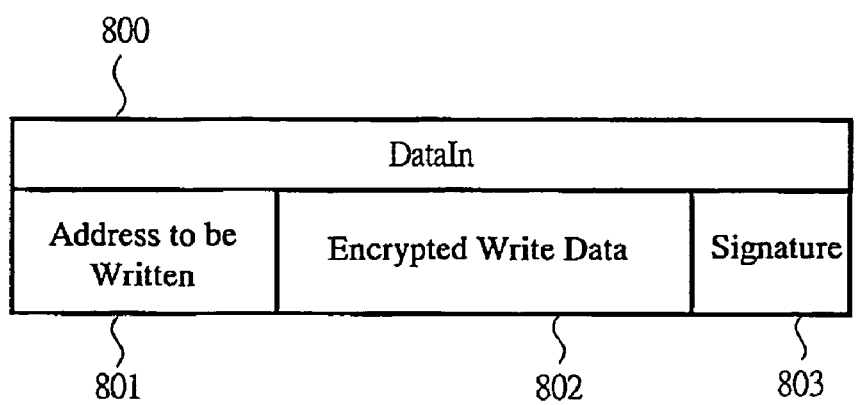
FIG. 8A and 8B is a diagram showing one example of a configuration of transmission data when an authenticated host apparatus performs a write/read-access to a secure data block administrated by an applet in the IC card chip in the embodiment to which the present invention has been applied.

A fourth command is a command which is issued when the host apparatus 160 write-accesses a secure data block, and a DataIn 800 thereof includes a record address 801 to be written and write data 802 obtained by encrypting data to be written using a shared key Ks, as shown in FIG. 8A. A signature 803 to the record address and the write data is added to an end of the DataIn 800. Thereby, falsification of the record address 801 performed by the third party can be detected, and decryption of the write data 802 is made impossible. The host apparatus 160 prepares such a fourth command using the shared key Ks and transmits the same to the MMC 110 through the secure write command (step 701).

The controller chip 120 sees the record address 801 to be written included in the fourth command, collates the same with a record number range indicated by the access information held in the RAM at the shared key setting time, and confirms whether or not the record address 801 exceeds an accessible range (step 702). When the record address 801 exceeds the accessible range, the controller chip 120 set the write result to "error", and the controller chip 120 proceeds to step 707. On the other hand, when the record address 801 does not exceed the accessible range, the controller chip 120 decrypts the write data 802 included in the fourth command using the shared key Ks held in the key register (step 703).

Then, the controller chip 120 verifies the signature 803 included in the fourth command using the shared key Ks like the above (step 704). When controller chip 120 has failed in the verification, it confirms the write result as "error" and proceeds to step 707. On the other hand, when the controller chip 120 has succeeded in the verification, it further encrypts the data restored at step 802 using the data encryption key Kd 122 and writes the data in a specific record in the active secure data block on the flash memory (steps 705 and 706). When the write has been successfully performed, the controller chip 120 recognizes the write result as "succession" and proceeds to step 707.

In step 707, the controller chip 120 transmits a response APDU including the write result to the host apparatus 160 through the secure read command as a fourth response. The host apparatus 160 receives the fourth response (step 708), and the write access processing is completed.

Figure 8B:
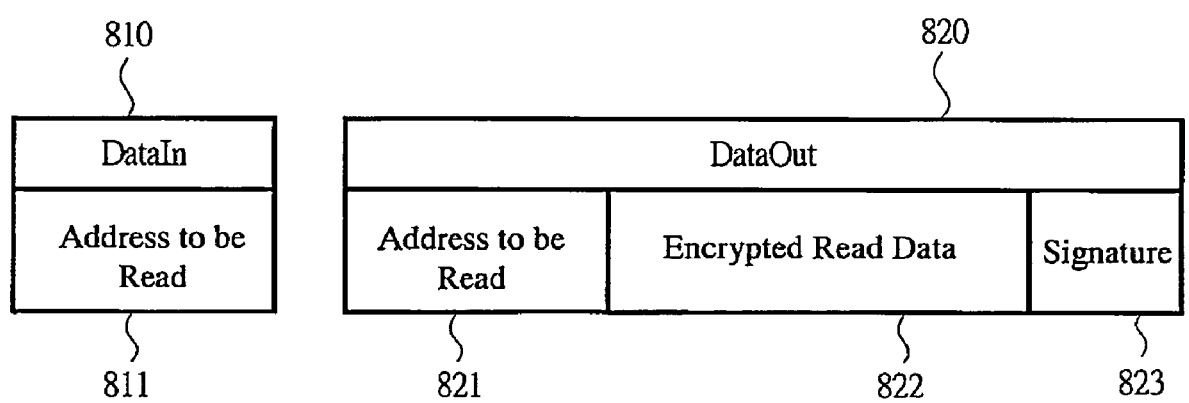

A fifth command is a command which the host apparatus 160 issues for a read-access to the secure data block, and DataIn 810 in the command includes a record address 811 to be read, as shown in FIG. 8B. The host apparatus 160 transmits the fifth command to the MMC 110 through the secure write command (step 711).

The controller chip 120 sees the record address 811 to be read included in the fifth command to collate the same with a record number range indicated by access information held in the RAM at a shared key setting time, and confirms whether or not the record address 811 exceeds the accessible range (step 712). When the record address 811 exceeds the accessible range, the controller chip 120 recognizes the read result as an "error" and proceeds to step 717. On the other hand, when the record address 811 does not exceed the record number range, the controller chip 120 reads data from a specific record in the active secure data block on the flash memory (steps 713 and 714). Then, the controller chip 120 decrypts the data using the data encryption key Kd 122 to restore data to be read.

Thereafter, in step 715, the controller chip 120 prepares a fifth response to be returned back to the host apparatus 160. The fifth response prepared here is a response indicating that the read result is "succession", and DataOut 820 in the response includes encrypted read data 822 and record address to be read 821, as shown in FIG. 8B. The record address 821 and a signature 823 to the read data 822 are added to an end of the DataOut 820. Thereby, falsification of the record address 821 performed by the third party can be detected and decryption of the read data 822 is made impossible. Signing and encrypting of the read data are performed using the shared key Ks held in the key register.

On the other hand, in step 717, the controller chip 120 prepares a fifth response to be returned back to the host apparatus 160. The fifth response prepared here is a response indicating that the read result is "failure", and an error code thereof is included in an SW1 and an SW2.

After preparing the fifth response, the controller chip 120 transmits the fifth response to the host apparatus 160 through the secure read command (step 716 or 717). The host apparatus 160 receives the fifth response (step 718). The host apparatus 160 can acquire read data safely and reliably by restoring the read data from the read data 822 included in the fifth response using the shared key Ks and by verifying the signature 823. As described above, the read-access processing is completed.

An access regarding the administration area 132 will be described below. The MMC 110 can respond to the following four administration commands so that the host apparatus 160 can access information in the administration area 132.

That is, there are four commands of (1) an applet registration command, (2) an applet unregistration command, (3) an administration table lock command, and (4) an administration table unlock command. The applet registration command (1) is a command for registering an applet utilizing the secure data area 133 for the administration table 136 and for allocating the secure data blocks used by the applet; the applet unregistration command (2) is a command for deleting registration information of an applet from the administration table 136 and for releasing allocation of a secure data block; the administration table lock command (3) is a command for prohibiting change of registration information on the administration table 136; and the administration table unlock command (4) is a command for accepting change of registration information on the administration table 136.

These commands are implemented according to a protocol of a secure write command and a secure read command like a general security processing, and they are processed by the controller chip 120. Exchange of information required for respective processing (registration, unregistration, lock, and unlock) is performed utilizing APDU (602 or 612 in FIG. 6) included in the secure write data and the secure read data inputted/outputted at the processing time.

In the applet registration command and the applet unregistration command, AID is set in the DataIn 606. An applet to be registered is specified by the AID. How to associate the AID and the secure data block with each other is determined by the controller chip 120. The host apparatus 160 can not specify the secure data block directly.

In the administration table lock command, a password of 255 bytes is set in the DataIn 606. The password is set in the password area 135, the lock flag 134 becomes FFh (in a lock state). Thereby, the applet registration command and the applet unregistration command become invalid. When the lock flag 134 has already been in a lock state, the password is not set in the password area 135 and the applet registration command and the applet unregistration command remains valid.

In the administration table unlock command, a password of 255 bytes is set in the DataIn. The password is compared with a value set in the password area 135 and if the former coincides with the latter, the lock flag 134 becomes 00h (in an unlock state). Thereby, the applet registration command and the applet unregistration command become valid. When lock flag 134 has already been in the unlock state, the applet registration command and the applet unregistration command remain invalid.

In valid states (unlock states) of the applet registration command and the applet unregistration command, such a wrong access can be caused that information on the administration table 136 is wrongly changed by the host apparatus 160 knowing no password or that a certain applet writes/reads a secure data block except for a secure data block which can be accessed by the applet itself. Therefore, the controller chip 120 does not allow an applet selected in the IC card chip 150 to access a secure data area in a state where the value of the lock flag 134 is 00h (in the unlock state). The host apparatus 160 must set the lock flag 134 to FFh necessarily through the administration table lock command after setting/changing of registration information on the administration table 136.

Figure 5:
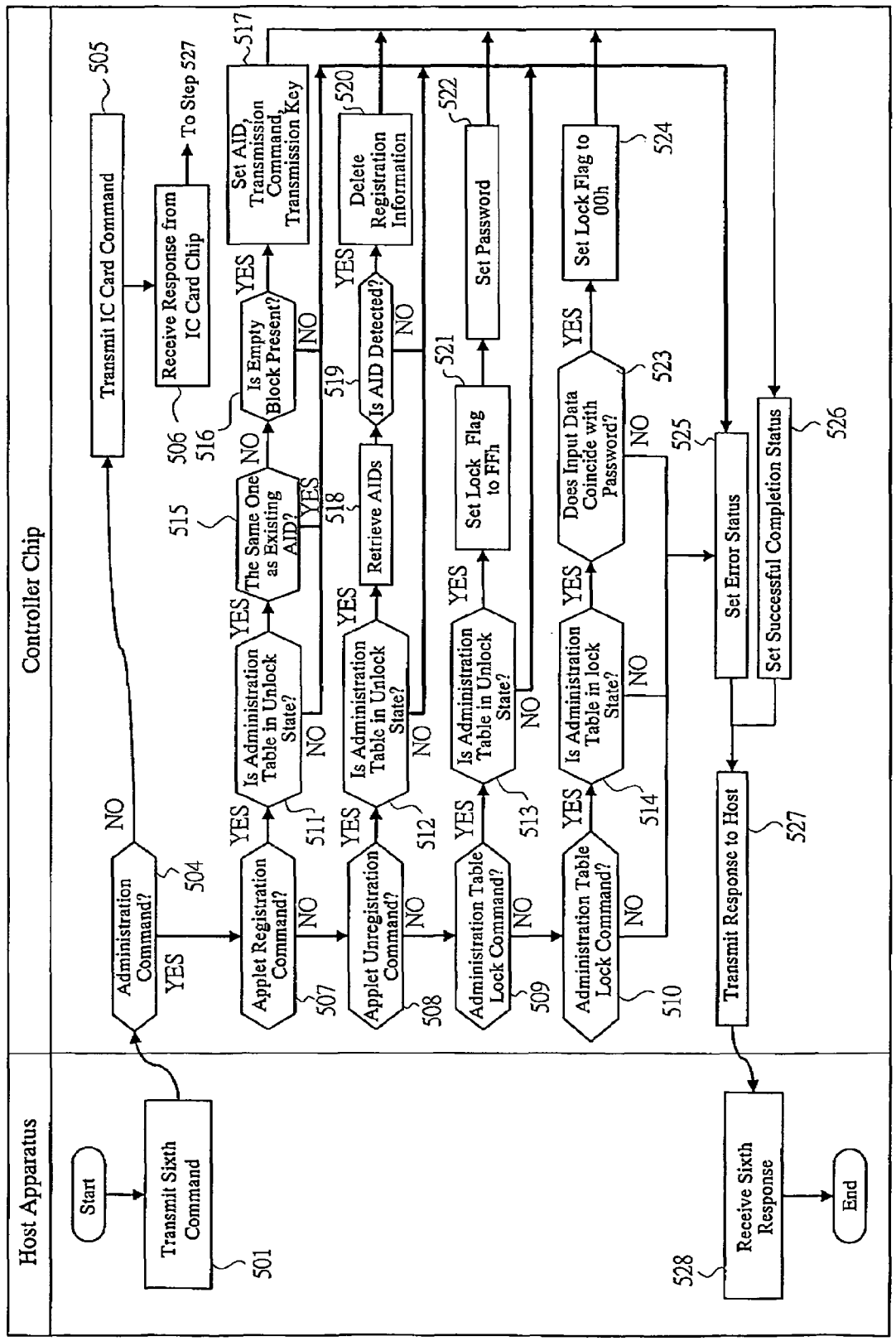
FIG. 5 is a flowchart showing one example of a processing of an administration command for performing applet registration etc. to an administration area on a flash memory chip in the embodiment to which the present invention has been applied.

A flow of a processing of the above four administration commands will be described with reference to FIG. 5.

A sixth command is a command which is issued by the host apparatus 160 when the host apparatus 160 should access information on the administration area 132, and the host apparatus 160 transmits the sixth command to the MMC 110 through the secure write command (step 501). The controller chip 120 examines whether or no the sixth command is an administration command (step 504). When the sixth command is the administration command, the controller chip 120 proceeds to step 507. On the other hand, when the sixth command is not the administration command, the controller chip 120 issues an IC card command to the IC card chip 150 using a command APDU 602 of the command (step 505), receives a response from the IC card chip 150 (step 506), and proceeds to step 527.

In step 507, the controller chip 120 examines whether or not the command APDU 602 indicates an applet registration command. When the command APDU 602 indicates the applet registration command, the controller chip 120 proceeds to step 511. Otherwise, the controller chip 120 examines whether or not the command APDU 602 indicates an applet unregistration command (step 508). When the command APDU 602 indicates an applet unregistration command, the controller chip 120 proceeds to step 512. Otherwise, the controller chip 120 examines whether or not the command APDU 602 indicates the administration table lock command (step 509). When the command APDU 602 is the administration table lock command, the controller chip 120 proceeds to step 513. Otherwise, the controller chip 120 examines whether or not the command APDU 602 indicates an administration-table unlock command (step 510). When the command APDU 602 is the administration table unlock command, the controller chip 120 proceeds to step 514. Otherwise, the controller chip 120 proceeds to step 525.

In step 511, the controller chip 120 sees the lock flag 134 to examine whether or not the administration table 136 is in an unlock state. When the administration table 136 is in the lock state, the controller chip 120 proceeds to step 525. When the administration table 136 is in an unlock state, the controller chip 120 examines whether the same one as the AID in the DataIn 606 is present in AIDs 137 which have been already registered (step 515). If being present, the controller chip 120 proceeds to step 525. If being not present, the controller chip 120 examines whether or not any space is present (namely, whether or not any secure data block having not been yet allocated is present) on the administration table 136 (step 516). When no space is present, the controller chip 120 proceeds to step 525. When the space is present, the controller chip 120 sets the AID, the transfer command, and the transfer key Kt included in the DataIn 606 in the AID 137, the transfer command 138, and the transfer key 139 corresponding to the secure data block (step 517). Thereby, the applet indicated by the AID acquires an ownership of the secure data block. The controller chip 120 then proceeds to step 526.

In step 512, the controller chip 120 sees the lock flag 134 to examine whether or not the administration table 136 is in an unlock state. When the administration table 136 is in a lock state, the controller chip 120 proceeds to step 525. When the administration table 136 is in an unlock state, the controller chip 120 retrieves all registered AIDs 137 using the AID in the DataIn 606 (step 518). When a corresponding AID has been found (step 519), the controller chip 120 deletes the AID 137, and a transmission command 138 and a transmission key 139 corresponding thereto from the administration table 136 (step 520). When no corresponding AID has been found, the controller chip 120 proceeds to step 525. Thereby, the applet indicated by the AID loses the ownership of the secure data block. The controller chip 120 then proceeds to step 526.

In step 513, the controller chip 120 sees the lock flag 134 to examine whether or not the administration table 136 is in an unlock state. When the administration table 136 is in a lock state, the controller chip 120 proceeds to step 525. When the administration table 136 is in an unlock state, the controller chip 120 sets FFh in the lock flag 134 (step 521) and puts the administration table 136 in a lock state. The controller chip 120 sets a password in the DataIn 606 in the password area 135 (step 522). The controller chip 120 then proceeds to step 526.

In step 514, the controller chip 120 sees the lock flag 134 to examine whether or not the administration table 136 is in an unlock state. When the administration table 136 is in an unlock state, the controller chip 120 proceeds to step 525. When the administration table 136 is in a lock state, the controller chip 120 examines whether a password in the DataIn 606 coincides with one set in the password area 135 (step 523). When the password in the DataIn 606 does not coincide with one set in the password area 135, the controller chip 120 proceeds to step 525. When the password in the DataIn 606 coincides with one set in the password area 135, the controller chip 120 set 00h in the lock flag 134 (step 524) to put the administration table 136 in an unlock state. The controller chip 120 then proceeds to step 526.

In step 525, the controller chip 120 prepares a response APDU 612 including a status code indicating an error content in order to indicate to the host apparatus 160 that an error has occurred in processing of the administration command, and it proceeds to step 527. In step 526, the controller chip 120 produces a response APDU 612 including a status code indicating successful completion (for example, 9000h) in order to indicate to the host apparatus 160 that a processing for the administration command has been successfully terminated, and it proceeds to step 527.

In step 527, the controller chip 120 transmits the response APDU 612 to the host apparatus 160 as a sixth response through the secure read command. The host apparatus 160 then receives the sixth response (step 528).

As described above, according to the embodiment, when an external host apparatus 160 authenticated by an applet of the IC card chip 150 reads and writes data on a memory area in the flash memory chip 130 allocated to the applet, the data can be transmitted efficiently at high speed without passing through the applet of the IC card chip 150.

Though the invention made by the present inventors has been described above specifically based on the embodiments, the present invention is not limited to the embodiments and, needless to say, may be variously modified and altered within a scope of not departing from the gist of the invention.

For example, in application of the present invention, the example that an exclusive status value such as 90FFh is set in the SW1 bytes 305, 327 and the SW2 bytes 306, 328 as a means for transmitting the shared key Ks to the controller chip 120 by the IC card chip 150 has been described. However, it is only one example, and the transmission may be performed by other means. For example, a status code except for 90FFh may be used, and an exclusive password or the like may be included in the DataOut 304, 326.

In application of the present invention, the MMC 110 may have a function of allowing change of a size of the secure data area 133 according to a new (or the) administration command. Further, the MMC 110 may have a function of allowing change of the number of divided secure data blocks (the division number=4 in the above example) according to a new (or the) administration command. The MMC 110 may have a function of allowing individual change of sizes of respective secure data blocks according to a new (or the) administration command.

In application of the present invention, the length of the above-described password is not required to be 255 bytes. However, it is preferable for safety that the password is longer.

In application of the present invention, there is a risk that confidential data regarding an applet utilizing a secure data block released by an applet unregistration command remains in the secure data block, and another applet which has obtained an ownership of the secure data block or an host apparatus 160 authenticated by the applet acquires the confidential data. Therefore, it is preferable for safety that data remaining after unregistation is erased. Implementation of the erasing may be performed during the processing of the above-described applet unregistration command or may be performed by the MMC 110 according to a new administration command from the host apparatus 160.

In application of the present invention, the fourth command and the fifth command used when the host apparatus 160 write/read-accesses the secure data block may not have the command APDU format in the IC card command necessarily. The fourth command and the fifth command may not be transmitted through the secure write command necessarily. Similarly, the fourth response and the fifth response are not required to have the response APDU format in the IC card command. The fourth response and the fifth response may not be received through the secure read command necessarily. Further, the shared keys Ks used for encrypting and signing of the DataIn 800 in the fourth command may not be the same value. Similarly, the shared keys Ks used for encrypting and signing of the DataOut 820 in the fifth response may not be the same value. That is, the encrypted shared key 324 in the response APDU 320 shown in FIG. 3C may include two kinds of a shared key for encrypting and a shared key for signing, and the key register 123 in the controller chip 120 may be configured of two kinds of a key register for encrypting and a key register for signing.

The present invention can be applied to a storage device (a hard disk drive or the like) other than the card form as long as the storage device includes a non-volatile storage medium, a controller chip thereof, a microcomputer chip specialized in a security processing.

The present invention relates to a storage device having a security function, is especially applicable effectively to a memory card having a flash memory chip, a controller chip, and an IC card chip, or the like, and can be also applied to a hard disk drive or the like.

What is claimed is:

1. A storage device comprising:
an interface for connecting to an external host apparatus;
an IC card function module configured to store application programs and execute the application programs;
a non-volatile memory having a data block allocated to each of the application programs and being configured to store, into the block, data relating to each of the application programs; and
a memory controller connected to the interface, the IC card function module, and the non-volatile memory, and having a cryptographic processing circuit and a volatile storage circuit,
wherein the IC card function module, non-volatile memory, and memory controller are formed on different chips,
the IC card function module is not directly connected to either the non-volatile memory or the host apparatus, and is configured to transmit/receive data to/from the non-volatile memory via the memory controller and transmit/receive data to/from the host apparatus via the memory controller and the interface,
the host apparatus and the IC card function module are configured to transmit/receive, to/from each other via the interface and the memory controller, a host random generated by the host apparatus and a card random generated by the IC card function module, and to use an authentication key of the host apparatus and an authentication key of the IC card function module to execute encryption and decryption, thereby authenticating each other,
the IC card function module is configured to generate, from the host random and the card random used for authentication, a shared key to be shared with the host apparatus and the IC card function module, and reserves the shared key,
the memory controller is configured to transmit, in response to a first command received from the host apparatus via the interface, an IC card command corresponding to the first command to the IC card function module; to detect, in response to a block selection request containing an application ID of one of the application programs in the IC card function module, whether the block in the non-volatile memory corresponding to the ID of the application program received from the IC card function module is present or not; to transmit, when the block corresponding to the ID application of one of the application programs is detected, a transmission command to the IC card function module; and to set, in response to an address range allowed to access the shared key and the host apparatus, the shared key and the address range received from the IC card function module to the volatile storage circuit, and
the memory controller is configured to encrypt or decrypt the data transmitted between the address range on the non-volatile memory and the host apparatus using the shared key by the cryptographic processing circuit, in response to a second command received from the host apparatus via the interface.

2. The storage device according to claim 1, wherein the non-volatile memory has an application ID for identifying the application program and an operation code for transmitting the shared key to the memory controller in a corresponding manner to each other.

3. The storage device according to claim 1, further comprising:
means for performing a change function, an addition function, or a deletion function of a contents of the administration region regarding an application program stored in the IC card function module; means for performing a lock function for prohibiting the change function, the addition function, or the deletion function; and means for performing an unlock function for unlocking the lock function.

4. The storage device according to claim 1, wherein the memory controller is configured to compare an application ID acquired from the IC card function module and an application ID acquired from the non-volatile memory, and to transmit, to the IC card function module, a third command including the operation code corresponding to the application ID when both coincide with each other.

5. The storage device according to claim 3, wherein the memory controller is configured to perform the change function, the addition function, the deletion function, the lock function, or the unlock function, in response to a fourth command from the host apparatus.

6. The storage device according to claim 1, wherein, when an address whose transmission is requested by the host apparatus is included in the address range, the memory controller is configured to permit transmission of the data between the non-volatile memory and the host apparatus.

7. The storage device according to claim 1,
wherein the main controller is configured to verify, in response to the shared key and the address range, the shared key received from the IC card function module and a signature received from the IC card function module; to refer to, when verification of the signature has succeeded, algorithm information of the shared key and a shared key received from the IC card function module to set up the cryptographic processing circuit, to set the shared key to the volatile memory circuit, and to transmit a verification result of the signature to the IC card function module; and to transmit, in response to a setting result of the shared key, a response containing the setting result of the shared key to the host apparatus ,the response being received from the IC card function module and being for replying to the first command.

8. The storage device according to claim 1,
wherein the IC card function module includes a power supplying terminal, a clock input terminal, a reset input terminal, an I/O terminal, and a ground terminal,
the power supplying terminal, the clock input terminal, the reset input terminal, and the I/O terminal except for the ground terminal are connected to the memory controller.

9. A storage device comprising:
an interface for connecting to an external host apparatus;
an IC card function module configured to store application programs and execute the application programs;
a non-volatile memory having a block allocated to each of the application programs and being configured to store, into the block, data relating to each of the application programs; and
a memory controller connected to the interface, the IC card function module, and the non-volatile memory,
wherein the IC card function module, non-volatile memory, and memory controller are formed on different chips,
the IC card function module is not directly connected to either the non-volatile memory or the host apparatus, and is configured to transmit/receive data to/from the non-volatile memory via the memory controller and transmit/receive data to/from the host apparatus via the memory controller and the interface,
the non-volatile memory includes an administration region where an application ID for identifying each of the application programs and a transmission key for encrypting transmission information between the IC card function module and the memory controller are stored in a corresponding manner to each other,
the host apparatus and the IC card function module are configured to transmit/receive, to/from each other via the interface and the memory controller, a host random generated by the host apparatus and a card random generated by the IC card function module, and use an authentication key of the host apparatus and an authentication key of the IC card function module to execute encryption and decryption, thereby authenticating each other,
the IC card function module is configured to generate, from the host random and the card random used for authentication, a shared key to be shared with the host apparatus and the IC card function module, and to reserve the shared key,
the memory controller is configured to transmit, in response to a first command received from the host apparatus via the interface, an IC card command corresponding to the first command to the IC card function module; to detect, in response to a block selection request containing an application ID of one of the application programs in the IC card function module, which is received from the IC card function module, whether the block in the non-volatile memory corresponding to the ID of one of the application programs is present or not; to transmit, when the block corresponding to the ID application of one of the application programs is detected, a transmission command to the IC card function module; and to use, in response to an address range allowed to access the shared key and the host apparatus, the transmission key received from the IC card function module to decrypt the shared key, and to set the shared key and the address range to the volatile storage circuit, and
the memory controller is configured to use, in response to a second command received from the host apparatus via the interface, the shared key to encrypt or decrypt the data transmitted between the address range on the non-volatile memory and the host apparatus by the cryptographic processing circuit.

10. A storage device comprising:
an interface for connecting to an external host apparatus;
an IC card function module configured to store an application program and execute the application program;
a non-volatile memory configured to store data related to the application program; and
a memory controller connected to the interface, the IC card function module, and the non-volatile memory,
wherein the IC card function module is configured to store and execute a plurality of the application programs,
the non-volatile memory is partitioned into a plurality of blocks,
each of the plurality of blocks is allocated to each application program, each block being configured to store each data,
the IC card function module, non-volatile memory, and memory controller are formed on different chips,
the IC card function module is not directly connected to either the non-volatile memory or the host apparatus, and is configured to transmit/receive data to/from the non-volatile memory via the memory controller and transmit/receive data to/from the host apparatus via the memory controller and the interface,
a first application program transmits/receives, to/from the host apparatus via the interface and the memory controller, a host random generated by the host apparatus and a card random generated by the IC card function module, and uses an authentication key of the IC card function module to execute encryption and decryption, thereby authenticating each other with the host apparatus, generating a shared key from the host random and the card random which have been used for authentication, sharing the shared key with the host apparatus,
the data in the first block is encrypted by the shared key when the data is transmitted between the host apparatus and the non-volatile memory,
the memory controller is configured to transmit, in response to a first command received from the host apparatus via the interface, an IC card command corresponding to the first command to the IC card function module; to detect, in response to a block selection request containing an application ID of the application program in the IC card function module, which is received from the IC card function module, whether the block in the non-volatile memory corresponding to the ID of the application program is present or not; to transmit, when the block corresponding to the ID application of the application program is detected, a transmission command to the IC card function module; and to set, in response to an address range allowed to access the shared key and the host apparatus, the shared key and the address range to the volatile storage circuit, the memory controller is configured to decrypt data inputted from the host apparatus by the shared key and to write the data in the first block when the host apparatus requests writing of data into the address range in the first block, and the memory controller is configured to read data to be outputted to the host apparatus from the first block and to encrypt the data by the shared key when the host apparatus requests reading of data from the address range in the first block.

* * * * *